Aug. 31, 1943.  W. H. MEATS  2,328,387
TRAILER VEHICLE
Filed Oct. 9, 1941   3 Sheets-Sheet 1
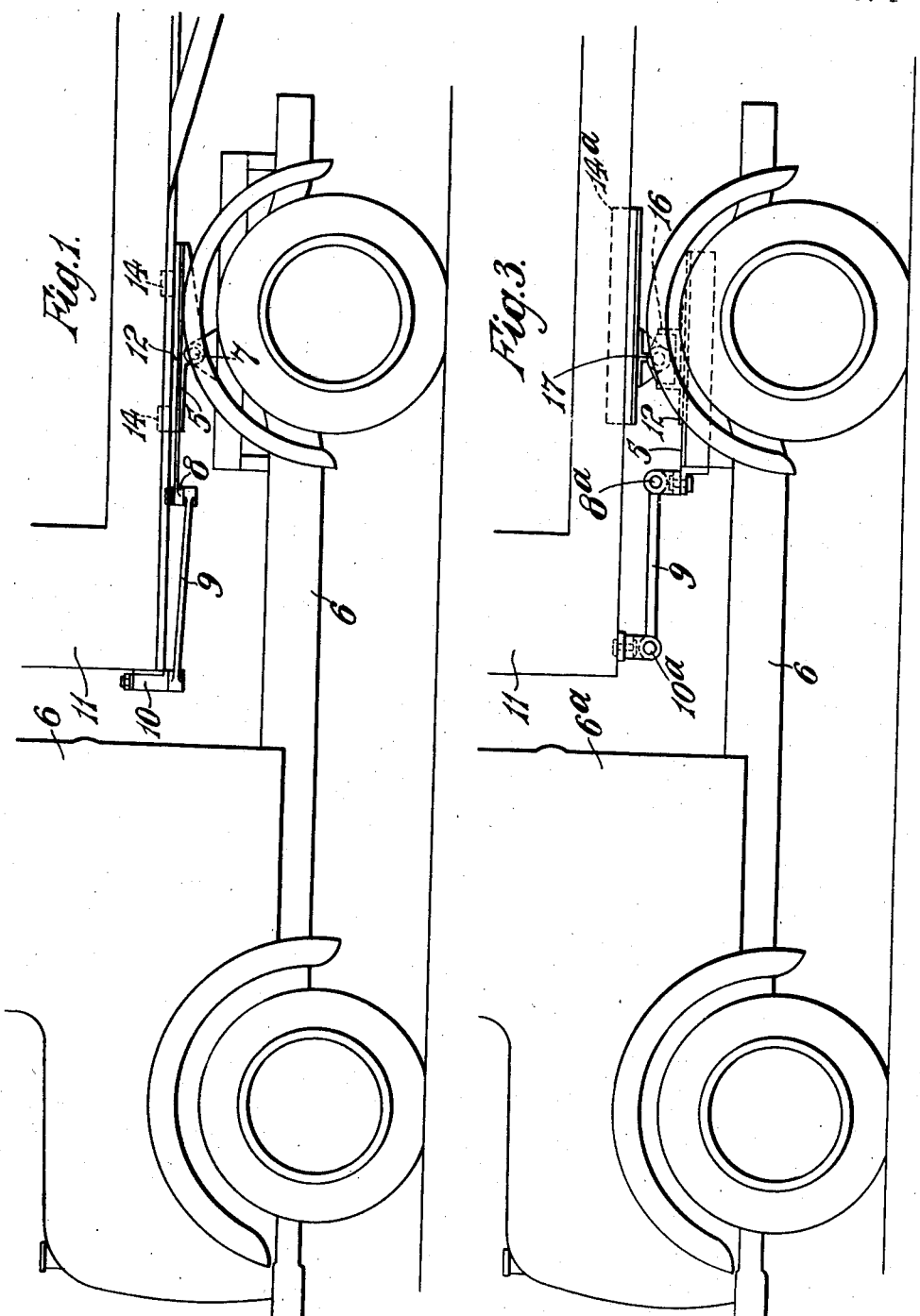
Inventor
WILLIAM HENRY MEATS
By Marshall & Marshall
Attorneys

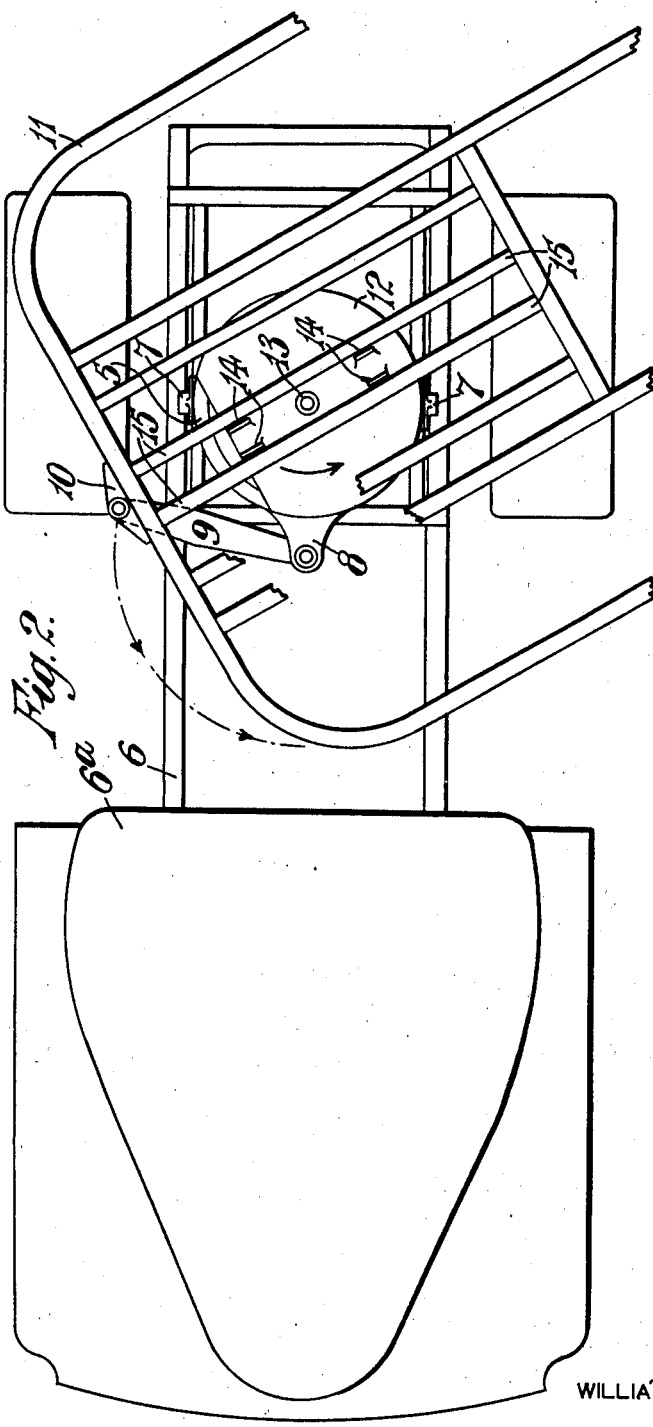

Aug. 31, 1943.   W. H. MEATS   2,328,387
TRAILER VEHICLE
Filed Oct. 9, 1941   3 Sheets-Sheet 3
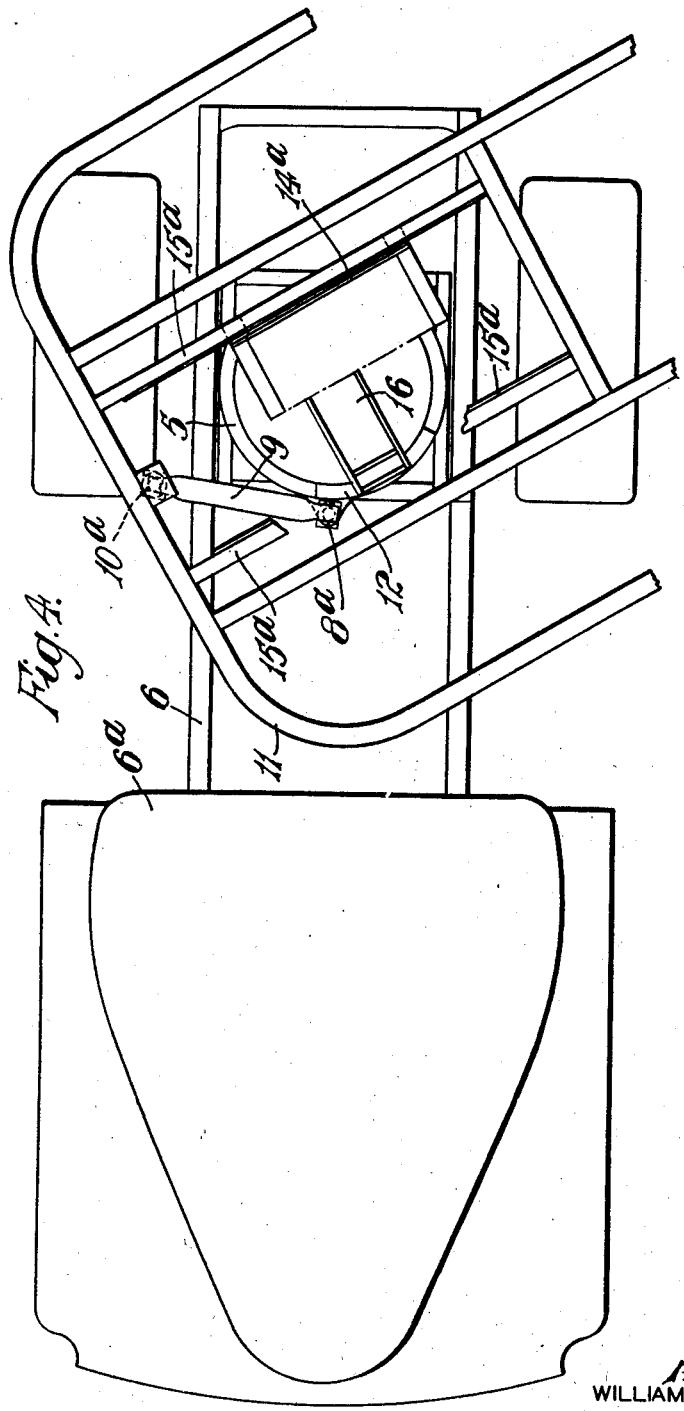
Inventor
WILLIAM HENRY MEATS
By Marshall & Marshall
Attorneys Patented Aug. 31, 1943

2,328,387

UNITED STATES PATENT OFFICE 2,328,387

TRAILER VEHICLE

William Henry Meats, Warwick, England, assignor to The Eagle Engineering Company Limited, Warwick, England, a British company Application October 9, 1941, Serial No. 414,317
In Great Britain September 14, 1940

4 Claims. (Cl. 280—33.1)

This invention has reference to improvements connected with trailer vehicles, and is more particularly applicable to trailer vehicles which are connected to an automobile and wherein the connection between the automobile and trailing vehicle is of the form which embodies a turntable, more particularly that type of turntable which is known as a retracting turntable wherein the trailing vehicle moves rearwardly relative to the tractor unit when the latter is on lock or about to turn a corner.

The object of the present invention is to permit of the trailer vehicle being mounted nearer the driver's cab of the tractor unit thereby affording increased body space and improving the appearance of the complete vehicle. It will be appreciated that two distinct movements take place when the vehicle is turned on lock. First the trailer turns in relation to the tractor unit and secondly the trailer moves backwards or forwards in a sliding motion, and it is desirable to dispose these two movements on independent frictional surfaces, so as to increase the efficiency of the relative motion obtaining between the tractor unit and the trailer. By disposing the turning and sliding motion so that this incorporates two frictional surfaces instead of the one surface normally obtaining, the frictional wear can be more adequately catered for and the surfaces more adequately lubricated and protected from dirt or other foreign matter.

The invention consists of a trailer vehicle more particularly of the kind hereinbefore specified incorporating a turntable connection between the tractor unit and the trailer unit, and is characterised by the provision of a plurality of separate frictional surface contacts associated with the turntable for the purpose of producing a combined rotational and traversing motion in a horizontal plane of the trailer unit relative to the tractor unit.

The invention will now be illustrated in two alternative forms by the accompanying drawings, in which similar reference numerals indicate similar parts in the different views.

Fig. 1 is a side elevation of part of the forward end of a vehicle incorporating a trailer mounted in accordance with this invention.

Fig. 2 is a plan of the parts seen in Fig. 1, illustrating the trailer vehicle turned through an angle in relation to the longitudinal centreline through the tractor vehicle.

Fig. 3 is a side elevation illustrating a modification in the construction and assembly of the turntable and link units as compared with Fig. 1.

Fig. 4 is a plan of the parts seen in Fig. 3 with the trailer vehicle turned through an angle in relation to the longitudinal centreline through the tractor vehicle.

Referring first to the construction shown in Figs. 1 and 2 of the drawings which illustrate the invention as applied to a motor vehicle which embodies a retractable turntable for an articulated six-wheeled trailer vehicle of known type, the lower section 5 of the turntable is mounted on the chassis frame 6 of the tractor unit by means of trunnions 7 which permit of the necessary rocking movement obtaining between the two units of the vehicle. A boss 8 is provided at the front of the lower section 5 of the turntable to which is pivotally attached a link 9 which extends laterally from this pivot and acts as a thrust member, the other end of the link being pivotally attached to a bracket 10 provided on the front of the trailer unit 11. The upper section 12 of the turntable is pivotally connected to the lower section 5 by means of a king pin 13 and this upper section 12 is mounted in the frame or chassis of the trailer unit 11. The top surface of this section 12 of the turntable is provided with frictional guide blocks or projections 14 which extend into register and engagement with longitudinally arranged guide slots formed in the floor or undersurface of the trailer unit 11 by means of parallel guide rails 15 which longitudinally extend for part of the length of the trailer unit.

By this means of connection between the tractor unit 6 and the trailer unit 11 it will be appreciated that in addition to the rotary or turning motion permitted to the trailer unit 11 relative to the tractor unit 6 a rearward or forward slidable motion, as the case may be, is imparted to the trailer unit 11 in relation to the rear or cab 6a of the tractor unit 6 through the radial link connection 9 and the frictional coupling obtaining between the upper section 12 of the turntable and the floor or undersurface of the trailer unit 11.

Referring now to the modification shown in Figs. 3 and 4 of the drawings, the lower section 5 of the turntable is rigidly secured to the tractor unit 6 and the upper section 12 of the turntable is directly but rotatably mounted thereon. Extending from this upper section 12 is a bracket 16 in which is provided with a pivotal or trunnion mounting 17 for the slidable guide block or member 14a which extends into engagement and register with the longitudinal slot obtaining between the parallel guide rails 15a formed on or attached to the undersurface or floor of the trailer unit 11. In this construction what may be termed the rear end of the radial link 9 is pivotally mounted on the lower section 5 of the turntable and the forward end of this link is connected to the front end of the trailer unit 11. In this construction it is desirable that the pivotal connection of the link or thrust member 9 shall incorporate a universal joint coupling 8a and 10a so as to provide for any uneven movement obtaining between the trailer unit 11 and the tractor unit 6 as well as for the radial movement of the arm 9 when the vehicle is turning.

In both of the illustrated constructions the turning and sliding motion of the trailer unit 11 relative to the tractor unit 6 is similar.

It will be appreciated that in both of the illustrations of the invention the link 9 which couples the bottom section 5 of the turntable to the forward end of the trailer unit 11 effects the rearward and forward motions of the trailer unit as the case may be, in a horizontal plane when a turning motion of the vehicle imparts a relative rotational motion between the two sections of the turntable, that is, when the tractor unit makes turning motion relative to the trailer unit a rearward motion is automatically imparted to the trailer unit 11 while this unit turns upon the turntable, and that when the tractor unit again assumes a straight path the trailer unit recovers its normal position longitudinally behind the tractor unit by a turning motion in the opposite direction of the trailer unit upon the turntable while at the same time a forward or thrusting motion is imparted to the forward end of the trailer unit.

I claim:

1. In a tractor-trailer vehicle, in combination, a lower member and an upper member supported thereon which are rotatable relative to one another, means for maintaining said relatively rotatable members centered with one another, a third member having associated therewith ways providing linear movement of said third member relative to one of said relatively rotatable members, the weight of the front end of the trailer being supported upon the rear end of the tractor through the engagement of said relatively rotatable members with one another, and also through the linearly movable engagement of said third member, and means actuated by relative rotation of the first and second members for producing relative linear movement of the third member to cause the tractor and trailer to move apart when they swing out of alignment with one another.

2. In a tractor-trailer vehicle, in combination, a member supported by the rear end of the tractor and rockable thereon about a transverse axis, a second member supported by the first member and rotatable relative thereto, means for maintaining the first and second members centered with one another, a third member which supports the front end of the trailer and is supported by the second member and has associated therewith ways providing linear movement of the third member relative to the second member in a direction parallel to the longitudinal axis of the trailer and means actuated by relative rotation of the first and second members for producing relative linear movement of the third member to cause the tractor and trailer to move apart when they swing out of alignment with one another.

3. In a tractor-trailer vehicle, in combination, a member supported by the rear end of the tractor, a second member supported by the first member and rotatable relative thereto, means for maintaining the first and second members centered with one another, a base supported by the second member and rockable thereon about an axis transverse to the trailer, a third member which supports the front end of the trailer and is supported by said base and has associated therewith ways providing linear movement of the third member relative to said base in a direction parallel to the longitudinal axis of the trailer, and means actuated by relative rotation of the first and second members for producing relative linear movement of the third member to cause the tractor and trailer to move apart when they swing out of alignment with one another.

4. In a tractor-trailer vehicle, in combination, a lower member and an upper member supported thereon which are rotatable relative to one another, means for maintaining said relatively rotatable members centered with one another, a third member having associated therewith ways providing linear movement of said third member relative to one of said relatively rotatable members, the weight of the front end of the trailer being supported upon the rear end of the tractor through the engagement of said relatively rotatable members with one another, and also through the linearly movable engagement of said third member, and a link having one end pivoted at a point substantially on the center line of the tractor and its other end pivoted at a point substantially on the center line of the trailer, said link being actuated by relative rotation of the first and second members for producing relative linear movement of the third member to cause the tractor and trailer to move apart when they swing out of alignment with one another.

WILLIAM HENRY MEATS.